United States Patent
Chik

(10) Patent No.: US 9,363,353 B1
(45) Date of Patent: Jun. 7, 2016

(54) MOBILE PHONE DOCKS WITH MULTIPLE CIRCULATING PHONE CONNECTORS

(71) Applicant: Hon Man Ashley Chik, Tsuen Wan (HK)

(72) Inventor: Hon Man Ashley Chik, Tsuen Wan (HK)

( * ) Notice: Subject to any disclaimer, the term of this patent is extended or adjusted under 35 U.S.C. 154(b) by 0 days.

(21) Appl. No.: 14/560,627

(22) Filed: Dec. 4, 2014

(51) Int. Cl.
| | |
|---|---|
| H04M 1/725 | (2006.01) |
| H04B 1/3883 | (2015.01) |
| H04M 1/04 | (2006.01) |
| H04W 4/02 | (2009.01) |
| H04N 7/18 | (2006.01) |
| H04N 5/232 | (2006.01) |

(52) U.S. Cl.
CPC ......... *H04M 1/72527* (2013.01); *H04B 1/3883* (2013.01); *H04M 1/04* (2013.01); *H04N 5/23238* (2013.01); *H04N 7/181* (2013.01); *H04W 4/026* (2013.01)

(58) Field of Classification Search
CPC ............ H04M 1/72527; H04B 1/3883; H04N 5/23238; H04N 7/181; H04W 4/026
See application file for complete search history.

(56) References Cited

U.S. PATENT DOCUMENTS

| | | | | |
|---|---|---|---|---|
| 7,089,291 | B1* | 8/2006 | Philyaw ............ | G06F 17/30722 455/557 |
| 2008/0125172 | A1* | 5/2008 | Leon .................... | G10H 1/0083 455/557 |
| 2011/0306389 | A1* | 12/2011 | Nagayama ............. | G01C 21/26 455/557 |
| 2012/0083314 | A1* | 4/2012 | Ng .......................... | H04M 1/11 455/557 |
| 2013/0250046 | A1* | 9/2013 | Schofield .................. | B60R 1/00 348/36 |
| 2013/0273970 | A1* | 10/2013 | Selim ................ | H04M 1/72519 455/557 |
| 2013/0344917 | A1* | 12/2013 | Sobti ................... | H04M 1/0254 455/557 |
| 2014/0333775 | A1* | 11/2014 | Naikal ................... | H04N 7/181 348/159 |

* cited by examiner

Primary Examiner — Vladimir Magloire
Assistant Examiner — Donald H Braswell

(57) ABSTRACT

According to embodiments of the invention, systems, methods and devices are directed to a docking assembly for recharging a number of docking phones. The docking phones are complementary to each other to act as dynamic IP cameras with each position of the phones being automatically adjusted in view of obstructing objects moving in front of the docking assembly. As a result, images are produced having the widest field of view angles, thereby eliminating blocking effects from the obstructing objects. The docking assembly may have additional features such as using a round base structure having docking connectors disposed on a circular track around the base structure such that any docking phones, when connected, can be moved freely along the circular track. The phones may work in unison to produce a flat, stitched image by connecting individual images produced by the connected phones.

9 Claims, 5 Drawing Sheets

MOBILE PHONE DOCKS WITH MULTIPLE CIRCULATING PHONE CONNECTORS

FIELD OF THE INVENTION

This invention is generally related to phone docking assemblies. With more specificity, the phone docking assemblies in this invention can be used for charging as well as using the connecting phones to maximize effectiveness of monitoring the on-going activities of the surrounding environment.

BACKGROUND OF THE INVENTION

Accessories of mobile phones, including phone docking assemblies, are becoming ever increasingly popular. A basic phone docking assembly allows a mobile phone connected to the phone docking assembly through a docking connector fixed on the phone docking assembly. When connected to the phone docking assembly, the battery inside the mobile phone can be recharged.

At the same time, the phone docking assembly may include loudspeakers that can be used to play music installed in the mobile phone. The more advanced phone docking assembly may include 2 connectors for charging multiple phone like devices. One good example is a dual docking assembly that can support charging both iPhone and iPad at the same time. Another current advanced feature includes a folding mechanism for the docking connector so that the mobile phone can be manually inserted onto the docking connector at an angle with greater flexibility to the user. The above uses of mobile phone assemblies are limited to charging batteries and phone speakers. These uses have undermined the value of using the phone docking assembly as a console to control connected mobile phones as home surveillance systems. Current home surveillance systems, on the other hand, are too inflexible, rigid, fixed in a location, and more importantly, too noticeable and thus too sustainable to having the suspecting objects to avoid the present cameras of the home surveillance systems.

Therefore, it is an objective of the disclosed technology to mitigate or at least alleviate such a problem by providing a new or otherwise improved speaker docking station with advanced home surveillance features.

SUMMARY OF THE INVENTION

According to embodiments of the invention, systems, methods and devices are directed to a docking assembly for recharging a number of docking phones. The docking phones are complementary to each other to act as dynamic IP cameras with each position of the phones be automatically adjusted in view of obstructing objects moving in front of the docking assembly in order to produce images of widest field of view angles eliminating blocking effects from the obstructing objects in form of a flat, combined image. Further in some embodiments, the docking assembly has additional features such as using a round base structure to base docking connectors on a circular track around the base structure so that any docking phones, when connected, can be moved freely along the circular track. In one embodiment, after the phones are inserted onto each docking connector manually by the user, the control unit prompts the digital compass included in each docking connector to determine the current location of the docking connector within the circular track by reporting the direction of the connected mobile phone is facing. In another embodiment, the sensor size and the present focal length from each mobile phone for the control unit is used to compute a summed, entire field of view angle from each view angle from the three connected mobile phones. In yet another embodiment, an image from each lens of the mobile phones for the control unit can be embedded in the rounded base structure to consolidate all the images from all the connected mobile phones. The objective of the embodiment can be used to produce a flat, combined image by connecting the images produced by the connected phones adjacently in order to yield a combined image with the widest area.

In an embodiment of the disclosed invention, a docking assembly is used for recharging a number of docking phones while the docking phones are complimentary to each other to act as dynamic IP cameras with each position of the phones automatically adjusted in view of obstructing objects moving in front of the docking assembly in order to produce images having the widest field of view angles thereby eliminating blocking effects from the obstructing objects in form of a flat, combined image.

The docking assembly may employ one or more of the following components: a) a rounded base structure supplying electrical currents to the docking assembly; b) three movable docking connectors, including a first, a second, and a third docking connector, wherein the three movable docking connectors are connectable to a maximum of three mobile phones including a first, second, and third mobile phone, wherein each mobile phone has a front camera with a lens of unique focal length, and a sensor of unique width and length; c) a digital compass included in each docking connector to determine a direction faced by a connected mobile phone; d) a remote infrared sensor included in each docking connector to determine whether objects are obstructing a camera view of a connected mobile phone; e) a circular track within the rounded base structure, wherein the three movable docking connectors are disposed on the circular track to facilitate the rotation of the connected mobile phones thereon; and/or f) a control unit embedded in the rounded base structure for controlling and coordinating with the three mobile devices.

Upon connection of the three mobile devices to the docking connectors, one or more of the following steps are taken, not necessarily in the following order, by: 1) initially after the three mobile phones are coupled onto each of the docking connectors manually by a user, the control unit prompts or requests: 1a) digital compass included in each docking connector to determine a current location of the docking connector within the circular track by reporting the direction faced by the connected mobile phone; 1b) the sensor size and the present focal length from each mobile phone for the control unit to compute a summed, entire field of view angle from each view angle from the three connected mobile phones; 1c) an image of a view from each lens of the mobile devices consolidate all the images from all the connected mobile phones; 2) maximizing the field of view angle of all the images captured by the connected three mobile phones by continuously detecting whether overlapping occurs between any two out of three mobile phones by: 2a) comparing the images from each lens of the mobile phones, if no overlapping of common portions of field of views are found, computing the entire field of view angle by summing the field of view angles of the three mobile devices; and 2b) when certain common portions of views are found from edges in any images of any of the two out of three mobile phones, deduce an overlapping angle from the common portions of views proportional to the sizes of the overlapping images, and computing the entire field of view angle by summing the field of view angle of the three mobile devices minus the overlapping angle; and 3) continuing to monitor whether any objects are blocking the field of view angle of one of the three mobile phones by: 3a) using the remote infrared sensor to detect whether any objects are found in front of the docking connector within a close distance; if no objects are found within the close distance, computing the entire field of view angle by summing the field of view angle of the three mobile devices; 3b) when a nearby object is detected by any one of the remote infrared sensors within the close distance, deducing a blocking angle from the image associated with the mobile device that is blocked, where the angle is computed as being proportional to a size of the nearby object on the image with respect to the image associated with the mobile phone connected to the docking connector including the infrared sensor, and computing the entire view angle by summing the view angle of the three mobile devices and subtracting the blocking angle; and: 3c) when it is concluded that the any one object is blocking the field of view angle of any one of the three mobile phones, moving the any one of three mobile phones away from the blocking object along the circular track enough to reduce the blocking angle to nearly zero; however, in reducing the blocking angle by moving the any one of the three mobile phones, ensuring that no overlapping angle is created as a result of the move, and if an overlapping angle is created, optimizing the entire field of view angle by moving the other two unaffected mobile devices to maximize an entire field of view angle.

In accordance with these and other objects which will become apparent hereinafter, the invention will now be described with particular reference to the drawings.

DETAILED DESCRIPTION

According to embodiments of the invention, systems, methods and devices are directed to a docking assembly for recharging a number of docking phones. The docking phones are complementary to each other to act as dynamic IP cameras with each position of the phones be automatically adjusted in view of obstructing objects moving in front of the docking assembly in order to produce images of widest field of view angles eliminating blocking effects from the obstructing objects in form of a flat, combined image. Further in some embodiments, the docking assembly has additional features such as using a round base structure to base docking connectors on a circular track around the base structure so that any docking phones, when connected, can be moved freely along the circular track. In one embodiment, after the phones are inserted onto each docking connector manually by the user, the control unit prompts the digital compass included in each docking connector to determine the current location of the docking connector within the circular track by reporting the direction of the connected mobile phone is facing. In another embodiment, the sensor size and the present focal length from each mobile phone for the control unit is used to compute a summed, entire field of view angle from each view angle from the three connected mobile phones. In yet another embodiment, an image from each lens of the mobile phones for the control unit can be embedded in the rounded base structure to consolidate all the images from all the connected mobile phones. The objective of the embodiment can be used to produce a flat, combined image by connecting the images produced by the connected phones adjacently in order to yield a combined image with the widest area.

Any of the features of the various embodiments described herein can be used in conjunction with features described in connection with any other embodiments disclosed unless otherwise specified or apparent from context.

Figure 1:
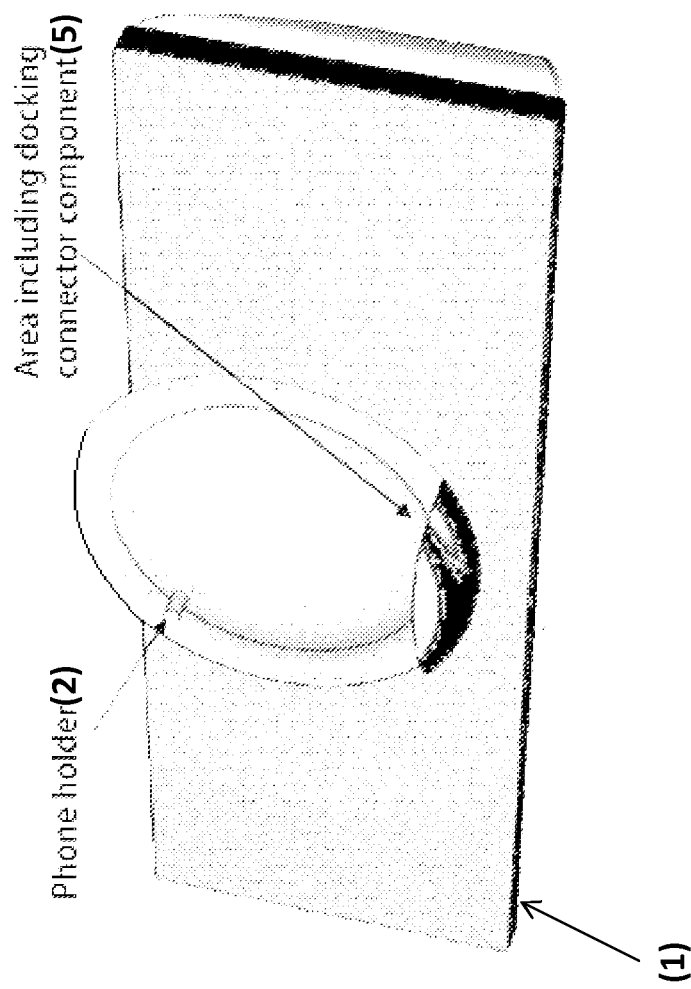
FIG. 1 shows a mobile phone docking assembly of the prior art.

Referring now to the figures, FIG. 1 shows a mobile phone docking assembly of the prior art. The docking assembly (1) of the prior art is fairly standard, having a docking connector component (5) adapted to receive a mobile phone or device thereon for purposes of display, standing and/or charging the mobile device. A phone holder (2) may be used to keep the phone upright on the docking assembly. The phone holder (2) may be a simple tab, as shown in FIG. 1, or any other fastening or structural component used to keep the phone in place.

Figure 2:
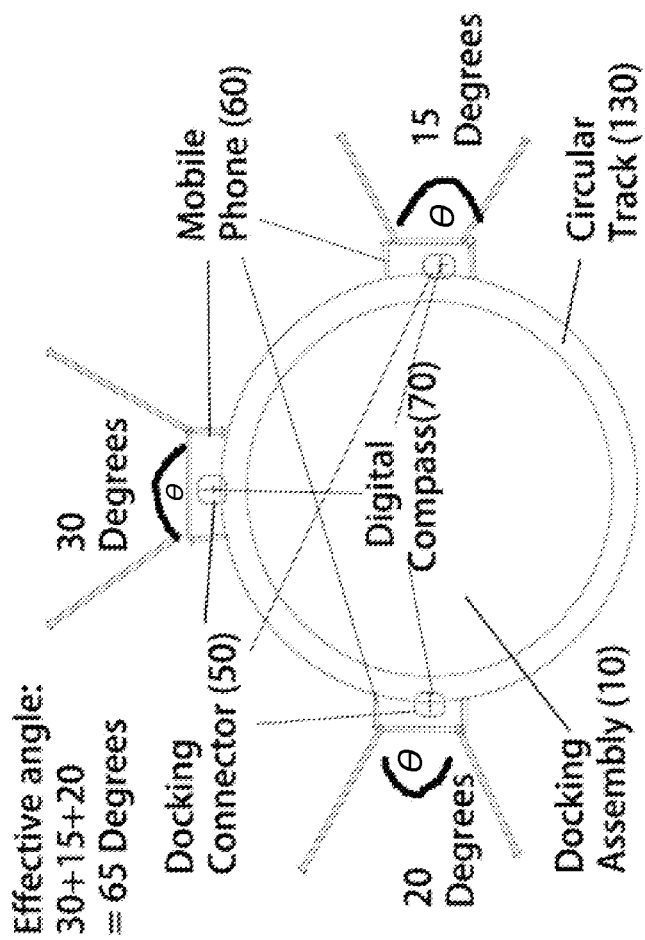
FIG. 2 shows a representation of an embodiment of the disclosed technology from the top view, indicating that no overlap or obstruction has been experienced by the three connected mobile phones.

Referring still to the figures, FIG. 2 shows a docking assembly (10) according to an embodiment of the disclosed technology. Included in the embodied assembly is a rounded base structure supplying electrical currents to the entire docking assembly (10), with three movable docking connectors (50) including a first, second, and third docking connector (50), wherein each docking connector (50) can be connected to a maximum of three mobile phones (60) including a first, second, and third mobile phone (60), with each mobile phone (60) includes a front camera with a lens of unique focal length, and a sensor of unique width and length.

Further into the embodiment, a circular track (130) is installed within the rounded base structure, wherein the three movable docking connectors (50) are placed on the circular track (130) allowing the mobile phones (60), when connected, to roll the docking connectors (50) and their connected mobile phones (60) along the circular track (130) freely for even a full circle.

In one embodiment, a control unit can be embedded in the rounded base structure, wherein the control unit controls and coordinates with the three mobile devices. During operation, when the three mobile devices are connected to the docking connectors (50), the key home surveillance feature of the present invention can kick in. First, the digital compass (70) included in each docking connector (50) can be used to determine the current location of the docking connector (50) within the circular track (130) by reporting the direction of the connected mobile phone (60) is facing. Next, information from each mobile phone (60) concerning the sensor size and the present focal length from each mobile phone (60) for the control unit is gathered by the docking assembly (10) through the control unit. Afterwards, such information can be used by the control unit to compute a value such that the entire field of view angle can be summed from each view angle from the three connected mobile phones (60). Thereafter, the control unit can prompt an image from each lens of the mobile phones (60) for the control unit embedded in the rounded base structure to consolidate all the images from all the connected mobile phones (60).

Figure 3:
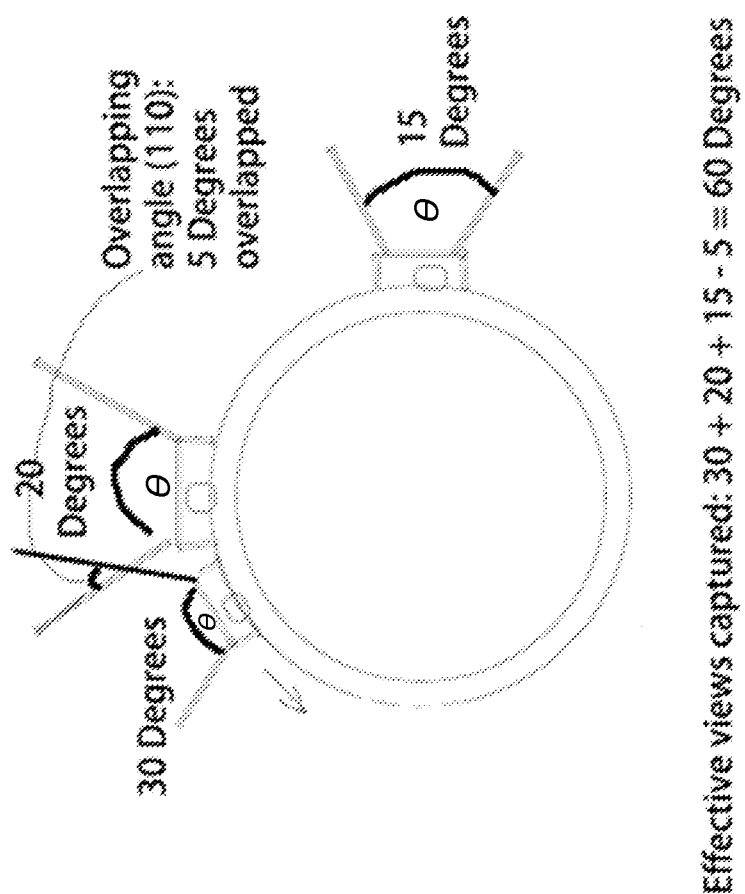
FIG. 3 shows a representation of an embodiment of the disclosed technology from the top view, indicating that overlapping occurs by two connected mobile phones.

FIG. 3 shows a representation of an embodiment of the disclosed technology from the top view, indicating that overlapping occurs by two connected mobile phones. To ensure images currently taken the mobile phones (60) yield the greatest field of view angle, tests are performed by the control unit after gather the above data. In one example, referring to FIG. 3, a test can be done to determine whether overlapping occurs between any two out of three mobile phones (60). The test can be started by comparing the received images from each lens of the mobile phones (60), if no overlapping of common portions of field of views are found from edges in the images of the mobile phones (60), computing the entire field of view angle by summing the field of view angles of the three mobile devices without concerning any overlapping issues.

However, when it is found that certain common portions of views are found from edges in any images of any of the two out of three mobile phones (60), further actions are instructed by the control unit to determine how better field of view angles can be achieved. This can be done by deducing an overlapping angle (110) from the common portions of views proportional to the sizes of the overlapping images, and computing the entire field of view angle by summing the field of view angle of the three mobile devices minus the overlapping angle (110).

Figure 4:
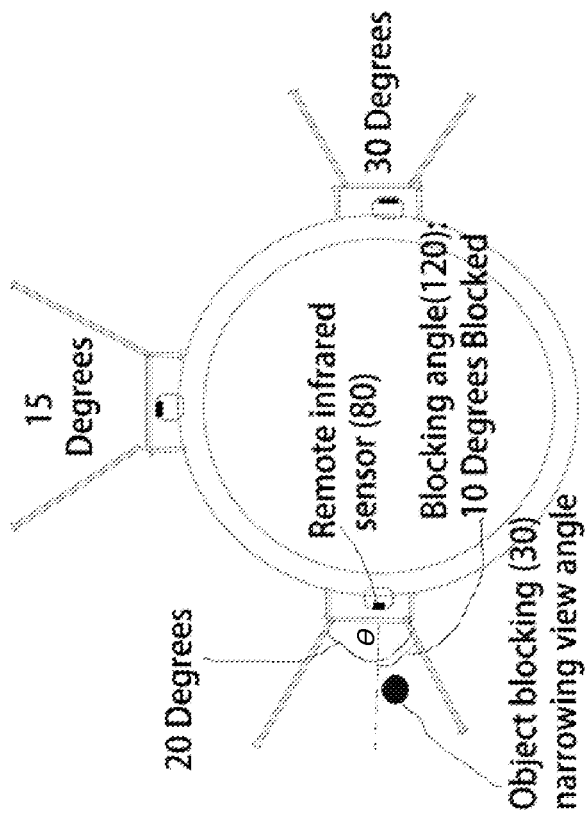
FIG. 4 shows a representation of an embodiment of the disclosed technology from the top view, indicating that blocking of views occurs to one of the three connected mobile phones.

FIG. 4 shows a representation of an embodiment of the disclosed technology from the top view, indicating that blocking of views occurs to one of the three connected mobile phones. Aside from testing overlapping field of views among mobile phones (60), further tests can be performed to see if greater field of views can be obtained by clearing obstructing or blocking objects (30). In one of our non-limiting example, as shown by FIG. 4, a test can be used to decide whether any objects (30) are blocking the field of view angle of one of the three mobile phones (60). Under the test, the remote infrared sensor (80) can be used to test whether any objects (30) are found in front of the docking connector (50) within a given close distance.

If no objects (30) are found within the given close distance, computing the entire field of view angle by summing the field of view angle of the three mobile devices without worrying blocking effects from nearby objects (30). However, when a nearby object (30) is detected by any one of the remote infrared sensor (80)s within the given close distance, other measures need to be taken, including deducing an blocking angle (120) from the image associated with the mobile phone (60) connected to the docking connector (50) including the infrared sensor (80), by proportional of size of the nearby object on the image with respect to the image associated with the mobile phone (60) connected to the docking connector (50) including the infrared sensor (80), and computing the entire view angle by summing the view angle of the three mobile devices minus the blocking angle (120).

In some configurations, instructions from the control unit are made to the docking connectors (50) to move the docking connectors (50) and subsequently the mobile phones (60) to another location along the circular track (130), so that the objective to gain the best or widest field of view angle can be achievement, consistent with the objectives of the present invention. The further instructions may include moving the mobile phones (60) away from each other along the circular track (130) just enough to reduce the overlapping angle (110) to almost zero, when it is concluded that overlapping of images occurs between the images currently captured by the mobile phones (60).

Figure 5:
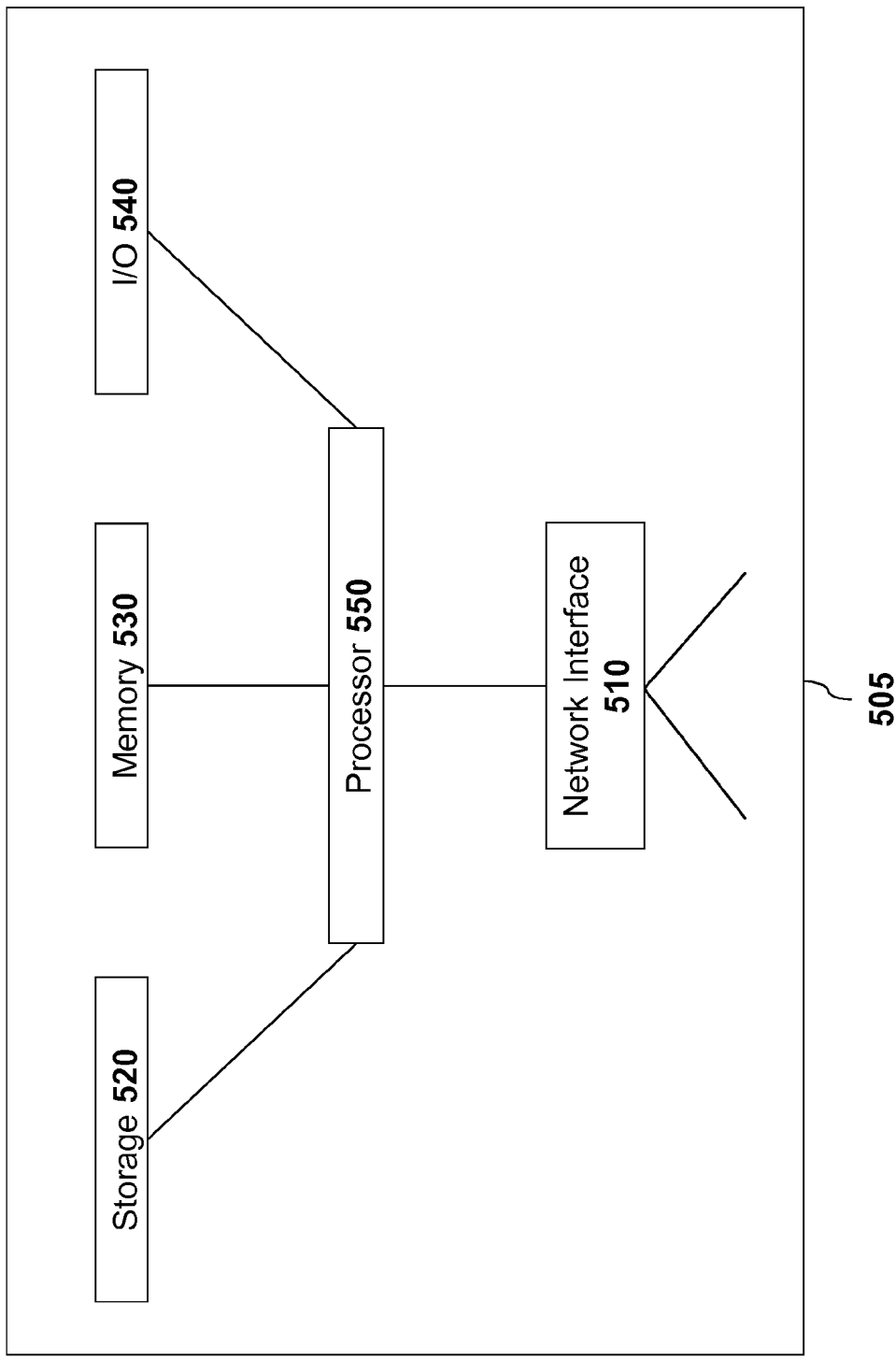
FIG. 5 is a high-level block diagram of a microprocessor device that may be used to carry out the disclosed technology.

FIG. 5 is a high-level block diagram of a microprocessor device that may be used to carry out the disclosed technology. The device 500 may or may not be a computing device. The device 500 comprises a microchip (also referred to as "a smart chip") and/or processor 550 that controls the overall operation of a computer by executing the reader's program instructions which define such operation. The device's program instructions may be stored in a storage device 520 (e.g., magnetic disk, database) and loaded into memory 530 when execution of the console's program instructions is desired. Thus, the device's operation will be defined by its program instructions stored in memory 530 and/or storage 520, and the console will be controlled by the processor 550 executing the console's program instructions.

The device 500 may also include one or a plurality of input network interfaces for communicating with other devices via a network (e.g., the internet). The device 500 further includes an electrical input interface for receiving power and data from a power or wireless data source. The device 500 may also include one or more output network interfaces 510 for communicating with other devices. The device 500 may also include input/output 540 representing devices which allow for user interaction with a computer (e.g., display, keyboard, mouse, speakers, buttons, etc.).

One skilled in the art will recognize that an implementation of an actual device will contain other components as well, and that FIG. 5 is a high level representation of some of the components of such a device for illustrative purposes. It should also be understood by one skilled in the art that the devices depicted and described with respect to FIGS. 1 through 4 may be implemented on a device such as is shown in FIG. 5. Thus, the device 500 of FIG. 5 may describe the inner workings of the docking assembly (10) of FIGS. 1 through 4 and/or any of the corresponding mobile phones (60).

While the disclosed invention has been taught with specific reference to the above embodiments, a person having ordinary skill in the art will recognize that changes can be made in form and detail without departing from the spirit and the scope of the invention. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

The invention claimed is:

1. A docking assembly for a plurality of mobile phones, comprising:

a rounded base structure configured to supply electrical currents to the docking assembly, the electrical currents for recharging the plurality of mobile phones;

a circular track within the rounded base structure;

three movable docking connectors disposed on the circular track, wherein each of the three movable docking connectors is movable around the circular track and is connectable to a mobile phone, wherein each mobile phone has a front camera with a lens of a focal length, and a sensor of a width and length;

a digital compass included in each docking connector to determine a direction faced by a connected mobile phone;

an infrared sensor configured to detect remote objects included in each docking connector to determine whether objects are obstructing a camera view of a connected mobile phone; and a control unit embedded in the rounded base structure for controlling and coordinating with the three mobile phones the control unit configured to do the following upon connection of the three mobile phones to the docking connectors:

initially after the three mobile phones are coupled onto each of the docking connectors manually by a user, the control unit is configured to prompt:

the digital compass included in each docking connector to determine a current location of the docking connector within the circular track by reporting the direction faced by the connected mobile phone;

each mobile phone for its camera sensor size and present focal length for the control unit to compute a summed, entire field of view angle from each view angle from the three connected mobile phones;

an image of a view from each front camera of the mobile phones consolidate all the images from all the connected mobile phones;

the control unit is further configured to maximize the field of view angle of all the images captured by the connected three mobile phones by:

continuously detecting whether overlapping occurs between any two out of three mobile phones by:

comparing the images from each front camera of the mobile phones and, if no overlapping of common portions of field of views are found, computing the entire field of view angle by summing the field of view angles of the three mobile phones; and when certain common portions of views are found from edges in any images of any of the two out of three mobile phones, deduce an overlapping angle from the common portions of views proportional to the sizes of the overlapping images, and computing the entire field of view angle by summing the field of view angle of the three mobile phones minus the overlapping angle;

monitoring whether any objects are blocking the field of view angle of one of the three mobile phones by:

using the infrared sensor to detect whether any objects are found in front of the docking connector within a close distance and; if no objects are found within the close distance, computing the entire field of view angle by summing the field of view angle of the three mobile phones;

when a nearby object is detected by any one of the infrared sensors within the close distance, deducing a blocking angle from the image associated with the mobile phone that is blocked, where the angle is computed as being proportional to a size of the nearby object on the image with respect to the image associated with the mobile phone connected to the docking connector including the infrared sensor, and computing the entire view angle by summing the view angle of the three mobile phones and subtracting the blocking angle; and the control unit further configured to move the any two of three mobile phones away from each other along the circular track just enough to reduce the overlapping angle to almost zero when it is concluded that overlapping occurs between any two out of three mobile phones; and after modification, if any, output a flat, combined image by connecting the three images adjacently, wherein the field of view angle of the combined image is the widest possible angle after eliminating any overlapping areas.

2. A docking assembly for a plurality of mobile phones, comprising:

a rounded base structure configured to supply electrical currents to the docking assembly, the electrical currents for recharging the plurality of mobile phones;

a circular track within the rounded base structure;

three movable docking connectors disposed on the circular track, wherein each of the three movable docking connectors is movable around the circular track and is connectable to a mobile phone, wherein each mobile phone has a front camera with a lens of a focal length, and a sensor of a width and length;

a digital compass included in each docking connector to determine a direction faced by a connected mobile phone;

an infrared sensor configured to detect remote objects included in each docking connector to determine whether objects are obstructing a camera view of a connected mobile phone; and a control unit embedded in the rounded base structure for controlling and coordinating with the three mobile phones, the control unit configured to do the following upon connection of the three mobile phones to the docking connectors:

initially after the three mobile phones are coupled onto each of the docking connectors manually by a user, the control unit is configured to prompt:

the digital compass included in each docking connector to determine a current location of the docking connector within the circular track by reporting the direction faced by the connected mobile phone;

each mobile phone for its camera sensor size and present focal length for the control unit to compute a summed, entire field of view angle from each view angle from the three connected mobile phones;

an image of a view from each front camera of the mobile phones consolidate all the images from all the connected mobile phones;

the control unit is further configured to maximize the field of view angle of all the images captured by the connected three mobile phones by:

continuously detecting whether overlapping occurs between any two out of three mobile phones by:

comparing the images from each front camera of the mobile phones and, if no overlapping of common portions of field of views are found, computing the entire field of view angle by summing the field of view angles of the three mobile phones; and when certain common portions of views are found from edges in any images of any of the two out of three mobile phones, deduce an overlapping angle from the common portions of views proportional to the sizes of the overlapping images, and computing the entire field of view angle by summing the field of view angle of the three mobile phones minus the overlapping angle;

monitoring whether any objects are blocking the field of view angle of one of the three mobile phones by:

using the infrared sensor to detect whether any objects are found in front of the docking connector within a close distance and; if no objects are found within the close distance, computing the entire field of view angle by summing the field of view angle of the three mobile phones;

when a nearby object is detected by any one of the infrared sensors within the close distance, deducing a blocking angle from the image associated with the mobile phone that is blocked, where the angle is computed as being proportional to a size of the nearby object on the image with respect to the image associated with the mobile phone connected to the docking connector including the infrared sensor, and computing the entire view angle by summing the view angle of the three mobile phones and subtracting the blocking angle; and the control unit further configured to move the any one of three mobile phones away from the blocking object along the circular track just enough to reduce the blocking angle to nearly zero when it is concluded that the any one object is blocking the field of view angle of any one of the three mobile phones; and after modification, if any, output a flat, combined image by connecting the three images adjacently, wherein the field of view angle of the combined image has the widest possible angle while eliminating any areas being blocked by any blocking objects.

3. A docking assembly for a plurality of mobile phones, comprising:

a structure configured to supply electrical currents to the docking assembly, the electrical currents for recharging the plurality of mobile phones;

a track within the structure;

a plurality of movable docking connectors disposed on the track, wherein each of the movable docking connectors is movable around the track and is connectable to a mobile phone, wherein each mobile phone has a front camera with a lens of a focal length, and a sensor of a width and length;

a digital compass included in each docking connector to determine a direction faced by a connected mobile phone;

an infrared sensor configured to detect remote objects included in each docking connector to determine whether objects are obstructing a camera view of a connected mobile phone; and a control unit embedded in the structure for controlling and coordinating with the mobile phones; the control unit configured to do the following upon connection of the mobile phones to the docking connectors, the control unit is configured to prompt:

the digital compass included in each docking connector to determine a current location of the docking connector within the track by reporting the direction faced by the connected mobile phones;

each mobile phone for its camera sensor size and present focal length for the control unit to compute a summed, entire field of view angle from each view angle from the connected mobile phones;

an image of a view from each front camera of the mobile phones consolidate all the images from all the connected mobile phones; and the control unit is further configured to maximize the field of view angle of all the images captured by the connected mobile phones.

4. The docking assembly of claim 3, wherein the structure is a rounded base structure.

5. The docking assembly of claim 3, wherein the track is circular.

6. The docking assembly of claim 3, wherein the control unit is further configured to continuously detect whether overlapping occurs between any two out of three mobile phones.

7. The docking assembly of claim 3, wherein the control unit is further configured to compare the images from each front camera of the mobile phones and, if no overlapping of common portions of field of views are found, in order to compute the entire field of view angle by summing the field of view angles of the mobile phones.

8. The docking assembly of claim 3, wherein the control unit is further configured to deduce an overlapping angle from the common portions of views proportional to the sizes of the overlapping images and compute the entire field of view angle by summing the field of view angle of the three mobile phones minus the overlapping angle, when it is found that certain common portions of views are found from edges in any images of the mobile phones.

9. The docking assembly of claim 3, wherein the control unit is further configured to monitor whether any objects are blocking the field of view angle of the mobile phones by using the infrared sensor to detect whether any objects are found in front of the docking connector within a close distance.

* * * * *